Dec. 31, 1957  H. C. LUDWIG ET AL  2,818,352
WELDING ELECTRODES
Filed May 28, 1954  6 Sheets-Sheet 1
Fig. 1.
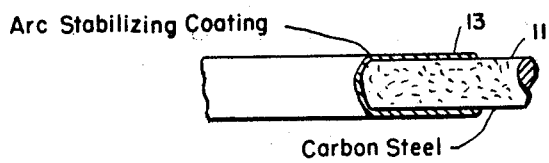
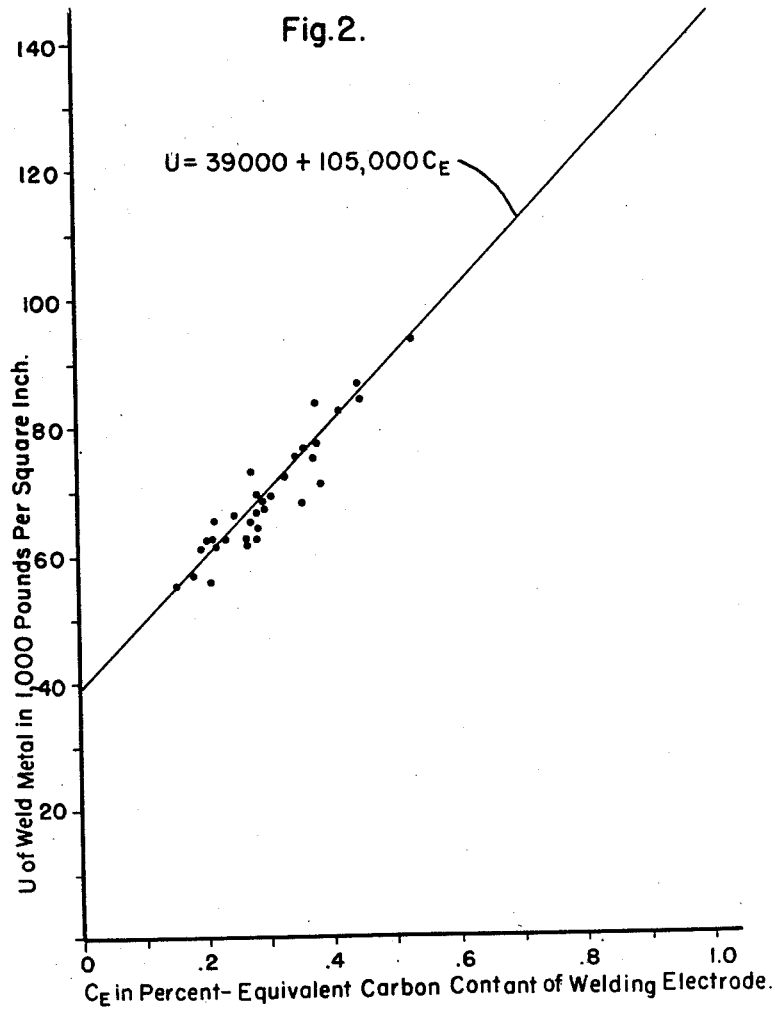
INVENTORS
Howard C. Ludwig
and Julius Heuschkel.

Percent Defection = $\dfrac{U \text{ Calculated} - U \text{ Measured}}{U \text{ Calculated}} \times 100$

United States Patent Office 2,818,352
Patented Dec. 31, 1957

2,818,352

WELDING ELECTRODES

Howard C. Ludwig, Pittsburgh, and Julius Heuschkel, Irwin, Pa., assignors to Westinghouse Electric Corporation, East Pittsburgh, Pa., a corporation of Pennsylvania Application May 28, 1954, Serial No. 432,958

6 Claims. (Cl. 117—205)

Our invention relates to electric arc welding and has particular relation to welding electrodes particularly for welding in a shield of inert gas.

This application relates to applications Serial No. 286,438, filed May 6, 1952, Serial No. 324,473, filed December 6, 1952 (hereinafter called Ludwig applications), and Serial No. 441,534, filed July 6, 1954, all to Howard C. Ludwig. The disclosures of the Ludwig applications are incorporated in this application by reference.

The Ludwig applications are directed to the art of arc welding in a shield of inert gas and disclose a consumable ferrous welding electrode consisting of a steel wire having a roughened surface on which is deposited a layer of oxygen-containing arc-stabilizing material.

Application 324,473 discloses this deposit as being a thin layer of material consisting of at least one oxygen containing compound selected from the class consisting of metal oxides, metal carbonates and metal phosphates, the compound being such that during the arc-welding process, it stabilizes the arc. This electrode is particularly suitable for welding at straight polarity (electrode negative) in an atmosphere of pure inert gas having a purity of 99.9% or better. The oxygen-containing stabilizing layer serves a double purpose in such welding. It stabilizes the arc causing it to operate steadily and with substantially no short circuits and abrupt voltage changes at straight polarity and in addition, determines the rate of consumption of the welding electrode and the extent of the penetration of the weld into the work. As Ludwig points out in these applications the coatings may be so selected that the welding at straight polarity can be at a far higher speed than at reverse polarity.

In practicing the inventions disclosed in the Ludwig applications, sound welds are produced but in certain respects it is desirable that the quality of the welds be improved and it is broadly an object of our invention to further improve the quality of these welds.

As a preliminary to the conception of our invention, welds were made and the efficiency of alloy transfer from the wire core to the weld was determined. The welds were then compared as to quality by measuring certain of their properties and to help in understanding our invention it appears advisable that some of these properties and the manner in which they are measured be described.

To determine the properties of a weld, a test sample of weld metal is subjected to tests and observation. A circularly cylindrical bar of .357 inch diameter machined from a mass of weld metal deposited on a workpiece in a normal welding operation was used for this purpose. The bar is subjected to various increasing loads to rupture and its resulting deformation measured. The properties usually considered are the ultimate tensile strength which will be called U herein, the yield strength which will be called Y herein, the ductility which is measured by elongation called $\epsilon$ herein, and the reduction in cross-sectional area, called R herein.

The nominal ultimate strength U is the stress in pounds per square inch under the maximum load resisted. U is determined by dividing the maximum load resisted in pounds by the original cross-sectional area of the sample in square inches.

The yield strength Y is the lowest stress in pounds per square inch at which the strain or deformation of the sample increases abruptly, that is the yield strength Y of the sample, is determined by dividing the load in pounds at which the deformation increases abruptly by the initial cross sectional area of the sample in square inches. It is the practice in structural design to set the loading limits so that the maximum stresses are lower than the yield strength. A high ratio of yield strength to ultimate strength (Y/U) is thus desirable since it permits structural loading of the material at lower ultimate strengths. Thus if Y/U is .50 the ultimate strength must be twice the yield strength, but if Y/U is .75, the ultimate strength need only be 1⅓ times the yield strength.

The elongation $\epsilon$ is observed in a section of the test cylinder bar, the section being located equidistant from the ends of the test bar, and having an unloaded length of 1½ inches. Before the bar is subjected to load, this 1½ inches is marked and as the bar is loaded the increase in the length of this marked section is observed as load is applied. The elongation $\epsilon$ is the percent of increase of this 1½ inch section as it is subjected to rupture load. It is desirable that $\epsilon$ be at least 20%.

The reduction of the cross section R, is the change between original and final cross sectional area at rupture in percent of the original cross section. R is computed from the original cross sectional area minus the cross sectional area at the rupture divided by the original cross sectional area, the resulting quotient being multiplied by 100. It is desirable that R be high.

The efficiency of the alloy transfer is observed by determining by chemical quantitative analysis of the material of the weld test sample the quantity or percentage of its alloying components and comparing these percentages with the corresponding percentages of alloying components in the original welding electrode. The efficiency of transfer for each component is the percent of the components originally in the electrode which is found to be present in the weld sample. It is usually desirable that the efficiency be high for all components.

Our studies of the welds produced, with the electrodes expressly disclosed in the Ludwig applications, reveal that while these welds are strong and sound, their ductility is not as high as is desirable for many purposes.

It is accordingly an object of our invention to provide a consumable electrode for electric arc welding with which sound welds having high ultimate tensile strength and high ductility shall be produced.

Still another object of our invention is to provide a ferrous welding electrode of the type having a coating of oxygen-containing arc-stabilizing material with which sound welds having high strength, high ductility and sound bead surfaces shall be produced.

It is a specific object of our invention to provide a consumable electrode for electric arc welding at straight polarity with which sound welds having high ultimate tensile strength and high ductility shall be produced.

A more specific object of our invention is to provide a ferrous welding electrode coated with a stabilizing oxygen-containing material for consumable electrode arc welding with which welds having an ultimate strength of at least 60,000 pounds per square inch, a high Y/U ratio, and an elongation $\epsilon$ of at least 20% shall be produced.

Another specific object of our invention is to provide a steel core for a welding electrode coated with an arc-stabilizing oxygen-containing material for consumable-electrode inert-gas shielded welding, the use of which shall produce welds having a high strength and a high ductility.

Our invention arises from the discovery that high-strength high-ductility welds may be produced by arc welding in an atmosphere of substantially pure inert-gas with a ferrous wire coated with at least one oxygen-containing stabilizing compound as disclosed in the Ludwig applications which has a wire core of composition properly related to the coating, the desired properties of the weld metal and the conditions under which the welding is carried out. Since the welding is carried out in an inert gas atmosphere, access of atmospheric oxygen and nitrogen to the weld is prevented and the components of the core wire are not reduced by this oxygen or nitrogen. In addition, the oxygen in the coating is just sufficient for arc stabilization and oxidizes the core-wire components only to a minor extent. There is, however, some loss from vaporization. Thus, the components of the core wire are transferred to a large extent to the weld and in determining the effect of the wire components on strength and ductility of weld metal, this fact must be kept in mind. In accordance with our invention then the core wire has a lower alloy content for a weld of given desired strength than prior art ferrous electrodes and contrary to the teachings of the prior art does not include chemicals for replacing the deficiency in the alloying components.

Specifically, the core, in accordance with our invention, consists essentially of iron alloyed with small quantities of carbon, manganese and silicon and does not include significant quantities of other alloy components such, for example, as chromium, nickel or aluminum, that is to say the content of carbon, manganese and silicon in the core should be appreciable while the remaining components should preferably not be present at all and if they are present they should be present only as trace impurities. The expression "consisting essentially of" then means in this application that the steel to which it applies may have trace impurities normally encountered in commercial practice, or the equivalent, which may be as high as of the order of several hundredths of one percent of other components such as chromium, aluminum, phosphorous, sulfur, etc. We have further found that the content of carbon, manganese and silicon should be mathematically related to the ultimate strength in accordance with the following equation:

(1) $\quad U = 39{,}000 + 105{,}000\ C + 14{,}000\ Mn + 16{,}000\ Si.$

Where U is the ultimate strength of the material of the weld produced with the electrode, C is the percent of carbon in the electrode core, Mn is the percent of manganese in the core and Si is the percent of silicon in the core. Equation 1 may be reformed by relating the manganese and silicon to the carbon in accordance with the relative effect that they have on the ultimate strength, a percent of manganese having the effect of .133 of a percent of carbon and a percent of silicon having the effect of .152 of a percent of carbon on the strength. Thus, as far as the strength is concerned, the above equation may be written as Equation (2) $\quad U = 39{,}000 + 105{,}000\ C_E$ where $C_E$ is the equivalent carbon content of the carbon, manganese and silicon and $C_E = C + .133\ Mn + .152\ Si$. Our studies show that Equations 1 and 2 apply for ultimate strengths extending to 90,000 pounds per square inch.

We have found that to achieve the desired ductility, the content of carbon, manganese and silicon in the core should be further so limited that $C_E$ does not exceed .46%, and where an ultimate strength of at least 60,000 pounds per square inch is desired $C_E$ should be no less than .2%. In any event the steel should have the following minimal contents:

|  | Percent |
|---|---|
| Carbon | .028 |
| Manganese | .58 |
| Silicon | .09 |

In accordance with the specific aspects of our invention, then, we provide a welding electrode having a coating of an arc-stabilizing oxygen-containing compound, the core of which satisfies the equation $U = 39{,}000 + 105{,}000\ C_E$ and in which the magnitude of $C_E$ is maintained between .2 and .46%.

The novel features that we consider characteristic of our invention are discussed generally above. The invention itself, both as to its organization and its mode of operation together with additional objects and advantages thereof, will be understood from the following description of specific embodiments when read in connection with the accompanying drawings, in which:

Figure 1 is a fragmentary view of an electrode in accordance with our invention with a portion of the coating cut away;

Fig. 2 is a graph showing the relationship of the ultimate strength U to the carbon equivalent $C_E$ of welds produced with the electrode in accordance with our invention;

Figure 3A:
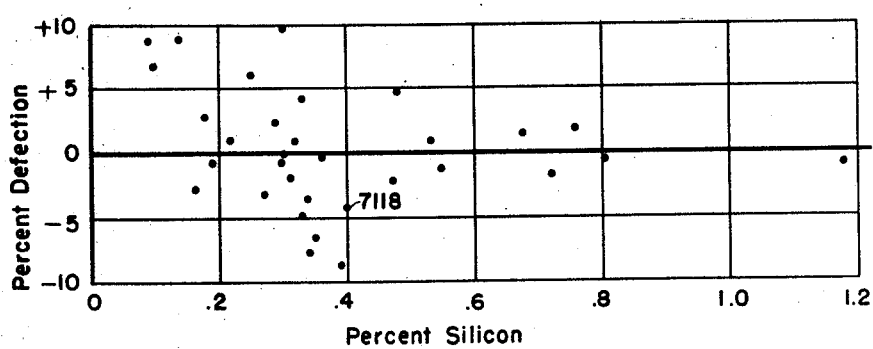
Figs. 3a, 3b and 3c are graphs showing the percent defection from the ultimate strength calculated on the basis of the above equation for different contents of silicon, manganese and carbon.

The electrode in accordance with our invention is as can be seen from Fig. 1 in the form similar to the electrodes disclosed in the Ludwig applications. It includes a core wire 11 which is roughened as disclosed in the Ludwig applications and on which a thin coating 13 of oxygen-containing arc-stabilizing material is deposited as disclosed in the Ludwig applications.

Our invention is tied up with the core 11 which is of steel having substantially only carbon, manganese and silicon as alloying components. The composition of the core satisfies Equation 1 or 2

$$U = 39,000 + 105,000\ C_E$$

but the $C_E$ must be less than approximately .46% to achieve the desired ductility and more than .20 to achieve the usually desirable strength of the weld metal and there should be at least .028% carbon, .58 manganese and .09 silicon.

Although the coating 13 may be composed of any of the materials disclosed in the Ludwig applications, it is desirable that it be composed of essentially titanium dioxide, manganese dioxide, and calcium oxide in the following proportions by weight: titanium dioxide 55% to 80%, manganese dioxide 10% to 20% and calcium oxide 10% to 35%, the preferred composition being titanium dioxide 65%, manganese dioxide 20% and calcium oxide 15%. The calcium oxide may be initially added or present in the electrode as it is used (by reason of reaction with moisture and carbon dioxide before use) as calcium oxide, calcium carbonate and calcium hydroxide. $MnO_2$ of certain types used in the practice of our invention is of substantial purity except that it contains substantial quantities, as high as 15%, of water which is baked out during subsequent treatment. Thus, there may be a variation in the quantity of $MnO_2$ as in the case of CaO. The variation in the actual weights of the components $MnO_2$, $TiO_2$ and CaO may then be as high as 10%.

In an actual situation the components added to produce a coating were as follows:

$MnO_2$—Assay 85%—(Fisher Scientific Co. Lot No. 520,063):

|  | Percent |
|---|---|
| Impurities insoluble in acid | .21 |
| Chloride (anion) | .02 |
| Sulphates (anion) | .32 |
| Alkalies and alkaline earths | 1.50 |
| Water (by weight) | 14.6 |
| $MnO_2$ | Remainder |

CaO—(Fisher Scientific Co. Cat. No. C-116):

| | |
|---|---|
| Impurities insoluble in acetic acid and ammonium hydroxide precipitate | .1 |
| Losses on ignition; including those from moisture driven-off and chemical reaction | 10 |
| Chloride (anion) | .005 |
| Nitrate (anion) | .01 |
| Sulphate (anion) | .08 |
| Alkalies (as MgO) | .005 |
| Iron | .015 |
| Zinc | .015 |
| CaO | Remainder |

$TiO_2$—(Fisher Scientific Co.—Cat. No. 315): About 95% pure from our experience.

The layer of oxygen containing material should be thin; a thickness of 2 to 5 milligrams per foot of wire of .062″ diameter is recommended.

Our invention was conceived following our study of welds produced with electrodes in accordance with the Ludwig application. This study revealed that the ductility of the Ludwig welds is not as high as desirable and we undertook to solve the problem of developing an electrode which would produce strong, ductile welds.

Our preliminary investigation of this problem gave rise to the concept that the desired ductility could best be achieved with electrodes having a steel core including no appreciable quantities of alloying components other than carbon, manganese and silicon. We proceeded to study electrodes with cores containing essentially only iron, carbon, manganese and silicon. Our invention arises from a study conducted with electrodes having cores produced from a large number of such alloy heats having different compositions of iron, carbon, manganese and silicon, some of which are in accordance with our invention and others not. In carrying out this study, the different core materials were coated with the oxygen-containing compounds just described in the proportions titanium dioxide 65%, manganese dioxide 20% and calcium oxide 15%, and test samples of welds produced with these electrodes by welding at straight polarity were tested. In each case, U, Y, $\epsilon$ and R were determined and the welds were analyzed to determine the efficiency of the alloy transfer. The welds from which the test samples were derived were deposited on ordinary hot rolled mild steel pieces having a manganese content of the order of .39%, a carbon content of the order of .15% and a residual silicon content of the order of .04% in an atmosphere of substantially pure argon having a purity of 99.5% or better. The welds were of the multipass type. The hot rolled pieces were cleaned by blasting with #60 grit sized alumina before the welding operation but the succeeding passes of the welds were made without treating the preceding passes or the reoxidized surfaces of the pieces.

The data derived from these studies on which our invention is based are presented in Tables I and II. Table I gives the compositions of the cores and the results of the strength and ductility tests. In the left-hand column the heat number of the alloy from which the core wire was derived is given. In the next three columns the results of the electrode core wire analysis in percentage is presented. The yield strength Y in pounds per square inch is given in the next column. The nominal ultimate strength U in pounds per square inch is given in the next column. The next column presents the elongation $\epsilon$ in percent. The reduction in area R is given in the next column and the ratio Y/U is given in the last column. In Table II the analysis of the wire, the weld deposit analysis and the alloy transfer efficiency is presented. The first through the fourth columns from the left are the same as the corresponding columns of Table I and are presented for ease in reading Table II. In the fifth through ninth columns the weld metal analysis is given. This analysis includes not only the carbon, manganese and silicon compositions, but also the nitrogen and oxygen content of the weld metal. The alloy transfer efficiency is given in the tenth, eleventh and twelfth columns for carbon, manganese and silicon respectively.

Table I shows that with the welding electrode in accordance with our invention high strength and high elongation are achieved in the weld metal. For most of the welds, the strength exceeded 60,000 which is the strength usually required. The elongation exceeded 20% except for heats 6959, 6961 and 7133. In the following discussion the basis for the limitation of the core wire to certain ranges of carbon equivalents $C_E$ will be presented with reference to Figs. 2, 4 and 5 and the other figures will be considered as bearing on other properties of our electrode.

TABLE I

*Average tensile properties of weld metal*

| Heat | Core Analysis (percent) | | | Yield Strength (p. s. i.)=Y | Nominal Ultimate Strength (p. s. i.)=U | Elongation In 1.5" (percent)= e | Reduction In Area (percent)= R | Ratio, Y/U |
|---|---|---|---|---|---|---|---|---|
| | C | Mn | Si | | | | | |
| 7118 | .028 | .80 | .40 | 47,600 | 61,400 | 34.3 | 76.6 | .777 |
| 6959 | .030 | 2.13 | .39 | 74,400 | 83,550 | 14.3 | 45.4 | .888 |
| 6960 | .030 | 2.08 | .72 | 71,400 | 82,200 | 22.4 | 71.4 | .869 |
| 7121 | .039 | .66 | .16 | 44,900 | 55,900 | 38.6 | 81.2 | .804 |
| 7086 | .048 | .99 | .67 | 54,275 | 66,750 | 23.4 | 55.6 | .813 |
| 7080 | .049 | .76 | .22 | 46,450 | 56,975 | 36.0 | 78.5 | .817 |
| 7081 | .052 | .77 | .33 | 51,150 | 62,850 | 31.6 | 69.5 | .816 |
| 7082 | .052 | .77 | .53 | 50,750 | 62,425 | 33.4 | 79.6 | .814 |
| 7085 | .052 | 1.03 | .48 | 51,650 | 62,725 | 30.2 | 54.1 | .823 |
| 7083 | .054 | 1.03 | .19 | 49,400 | 61,650 | 34.4 | 80.2 | .801 |
| 7084 | .058 | 1.03 | .34 | 54,250 | 66,400 | 34.2 | 76.9 | .818 |
| 7089 | .060 | 1.54 | .55 | 63,400 | 75,125 | 26.9 | 55.8 | .843 |
| 6961 | .060 | 2.17 | 1.18 | 79,800 | 93,300 | 16.4 | 38.8 | .857 |
| 7120 | .061 | 1.88 | .33 | 60,400 | 72,250 | 30.5 | 73.1 | .835 |
| 7088 | .061 | 1.46 | .29 | 57,175 | 67,525 | 28.2 | 69.5 | .845 |
| 7090 | .062 | 1.48 | .76 | 65,475 | 75,575 | 29.6 | 69.8 | .865 |
| 7087 | .063 | 1.41 | .18 | 53,175 | 65,100 | 30.9 | 76.2 | .817 |
| 7119 | .063 | 1.42 | .10 | 49,975 | 61,525 | 33.9 | 77.9 | .810 |
| 7076 | .066 | .76 | .35 | 54,100 | 65,750 | 30.1 | 68.2 | .823 |
| 7077 | .070 | .76 | .27 | 51,400 | 62,600 | 33.8 | 76.2 | .820 |
| 7125 | .090 | .80 | .09 | 44,375 | 55,500 | 37.7 | 80.8 | .800 |
| 7128 | .091 | 2.32 | .30 | 70,650 | 84,150 | 24.3 | 70.2 | .840 |
| 7127 | .11 | 1.50 | .31 | 56,800 | 68,150 | 32.4 | 78.9 | .833 |
| 7078 | .12 | .80 | .34 | 60,600 | 73,200 | 21.3 | 51.0 | .829 |
| 7079 | .135 | .78 | .31 | 57,000 | 69,725 | 28.1 | 60.8 | .817 |
| 7126 | .14 | .80 | .25 | 53,300 | 64,350 | 31.4 | 77.9 | .830 |
| 7129 | .14 | 1.51 | .30 | 59,850 | 71,150 | 30.7 | 76.5 | .841 |
| 7130 | .15 | .78 | .32 | 56,200 | 69,450 | 30.3 | 70.9 | .812 |
| 7123 | .16 | .64 | .30 | 55,100 | 68,950 | 26.7 | 57.4 | .802 |
| 7124 | .16 | .58 | .80 | 63,250 | 76,850 | 24.7 | 60.7 | .825 |
| 7122 | .18 | .60 | .14 | 49,675 | 62,450 | 30.7 | 65.4 | .796 |
| 7131 | .21 | .82 | .36 | 63,300 | 77,650 | 27.3 | 64.0 | .815 |
| 7132 | .26 | .84 | .47 | 70,350 | 86,850 | 25.6 | 58.7 | .810 |
| 7133 | .49 | .84 | .43 | 75,250 | 90,050 | 9.1 | 16.2 | .835 |

TABLE II

*Analysis of core and weld metal*

| Heat | Core Analysis (percent) | | | Weld Metal Analysis (percent) | | | | | Alloy Transfer Efficiency (percent) | | |
|---|---|---|---|---|---|---|---|---|---|---|---|
| | C | Mn | Si | C | Mn | Si | N | O | C | Mn | Si |
| 7118 | .028 | .80 | .40 | .018 | .62 | .28 | .007 | ------ | 64 | 78 | 70 |
| 6959 | .030 | 2.13 | .39 | .034 | 1.66 | .27 | .018 | ------ | 113 | 78 | 69 |
| 6960 | .030 | 2.08 | .72 | .044 | 1.62 | .48 | .015 | ------ | 146 | 78 | 67 |
| 7121 | .039 | .66 | .16 | .019 | .56 | .10 | .004 | ------ | 49 | 85 | 62 |
| 7086 | .048 | .99 | .67 | .025 | .77 | .54 | .006 | .029 | 52 | 78 | 81 |
| 7080 | .049 | .76 | .22 | .048 | .55 | .15 | .009 | .030 | 98 | 72 | 68 |
| 7081 | .052 | .77 | .33 | .046 | .56 | .21 | .011 | .020 | 89 | 73 | 64 |
| 7082 | .052 | .77 | .53 | .046 | .56 | .38 | .010 | .025 | 89 | 73 | 72 |
| 7085 | .052 | 1.03 | .48 | .046 | .76 | .35 | .009 | .018 | 89 | 74 | 73 |
| 7083 | .054 | 1.03 | .19 | .030 | .68 | .13 | .010 | .021 | 56 | 66 | 68 |
| 7084 | .058 | 1.03 | .34 | .021 | .84 | .27 | .009 | .018 | 36 | 82 | 79 |
| 7089 | .060 | 1.54 | .55 | .044 | 1.29 | .48 | .009 | .027 | 73 | 84 | 87 |
| 6961 | .060 | 2.17 | 1.18 | .044 | 1.70 | 1.01 | .018 | ------ | 73 | 78 | 86 |
| 7120 | .061 | 1.88 | .33 | .034 | 1.66 | .27 | .006 | ------ | 56 | 88 | 82 |
| 7088 | .061 | 1.46 | .29 | .046 | 1.16 | .25 | .010 | .021 | 75 | 79 | 86 |
| 7090 | .062 | 1.48 | .76 | .032 | 1.26 | .65 | .006 | .017 | 52 | 85 | 86 |
| 7087 | .063 | 1.41 | .18 | .036 | 1.19 | .11 | .007 | .020 | 57 | 84 | 61 |
| 7119 | .063 | 1.42 | .10 | .029 | 1.16 | .02 | .007 | ------ | 46 | 82 | 20 |
| 7076 | .066 | .76 | .35 | .037 | .64 | .29 | .003 | .025 | 56 | 84 | 83 |
| 7077 | .070 | .76 | .27 | .040 | .61 | .21 | .003 | .031 | 57 | 80 | 78 |
| 7125 | .090 | .80 | .09 | .030 | .64 | .02 | .004 | ------ | 33 | 80 | 22 |
| 7128 | .091 | 2.32 | .30 | .072 | 1.96 | .24 | .008 | ------ | 79 | 85 | 80 |
| 7127 | .11 | 1.50 | .31 | .040 | 1.18 | .23 | .009 | ------ | 36 | 79 | 74 |
| 7078 | .12 | .80 | .34 | .081 | .63 | .27 | .011 | .022 | 67 | 79 | 79 |
| 7079 | .135 | .78 | .31 | .083 | .66 | .28 | .006 | .014 | 61 | 85 | 90 |
| 7126 | .14 | .80 | .25 | .070 | .62 | .18 | .004 | ------ | 50 | 78 | 72 |
| 7129 | .14 | 1.51 | .30 | .063 | 1.18 | .22 | .008 | ------ | 45 | 78 | 73 |
| 7130 | .15 | .78 | .32 | .088 | .62 | .25 | .004 | ------ | 59 | 79 | 78 |
| 7123 | .16 | .64 | .30 | .074 | .52 | .24 | .010 | ------ | 46 | 81 | 80 |
| 7124 | .16 | .58 | .80 | .078 | .50 | .65 | .012 | ------ | 49 | 86 | 81 |
| 7122 | .18 | .60 | .14 | .068 | .49 | .09 | .004 | ------ | 38 | 82 | 64 |
| 7131 | .21 | .82 | .36 | .13 | .66 | .31 | .005 | ------ | 62 | 81 | 86 |
| 7132 | .26 | .84 | .47 | .17 | .70 | .40 | .006 | ------ | 65 | 83 | 85 |
| 7133 | .49 | .84 | .43 | .25 | .68 | .37 | .012 | ------ | 51 | 81 | 86 |
| Average | | | | | | | | | 64 | 80 | 73 |
| Standard Deviation | | | | | | | | | 22 | 3.3 | 16 |
| Coefficient of Variation | | | | | | | | | .34 | .04 | .23 |

Tables I and II include data taken with electrodes in accordance with our invention as well as data taken with electrodes in which the core wire does not have the content in accordance with our invention. The preliminary data which lead up to our invention was taken with heats 6959, 6960 and 6961. These heats were prepared with high compositions of manganese and correspondingly low compositions of carbon on the theory that ductility would be reduced by the presence of a gaseous oxide in the weld material, and since carbon produces a gaseous oxide and manganese a solid oxide, the latter was preferred. In addition, carbon itself in steel tends to reduce ductility.

The data derived from the heats 6959, 6960 and 6961, studied at the start of our investigation, demonstrate this theory not to have been categorically correct. The weld produced with an electrode having a core wire of heat 6959 had an elongation of 14.3% and the weld produced with the core wire of heat 6961 had an elongation of 16.4%. Both are well below the minimum of 20%. The 22.4% elongation of the weld produced with the electrode having a core wire from heat 6960 is above the limit. In addition, the weld was entirely sound. This confirmed the conclusion that the desired ductility and strength could be obtained with a carbon silicon manganese steel but showed that the problem is far more complex than the provision of adequate deoxidation components. With this in mind, we had the large number of heats listed in Table I made, and studied welds produced with electrodes having cores of these heats and the relationship of their properties. From this study we conceived our invention.

The basic relationships of Equations 1 and 2 which govern the composition of the core wire of the electrode in accordance with our invention was derived from Fig. 2 in which the ultimate strength of the weld metal U in pounds per square inch is plotted vertically and the carbon equivalent $C_E$ is plotted horizontally. The points for this curve are based on the actual data given in Table I. It is seen that the graph is a line which satisfies the basic Equation 2 $U=39,000+105,000\ C_E$.

Figure 3B:
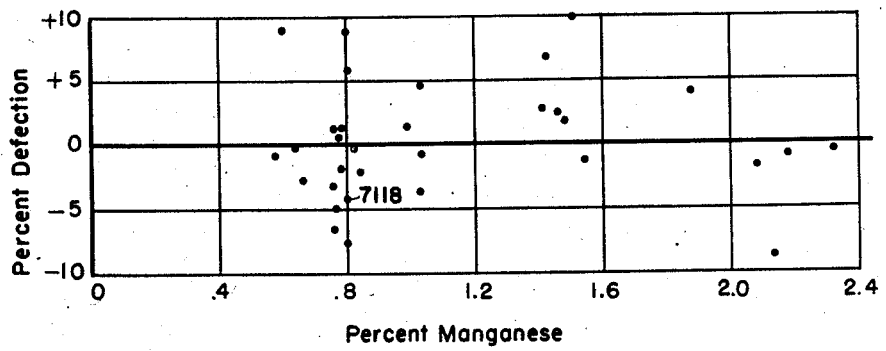
Figure 3C:
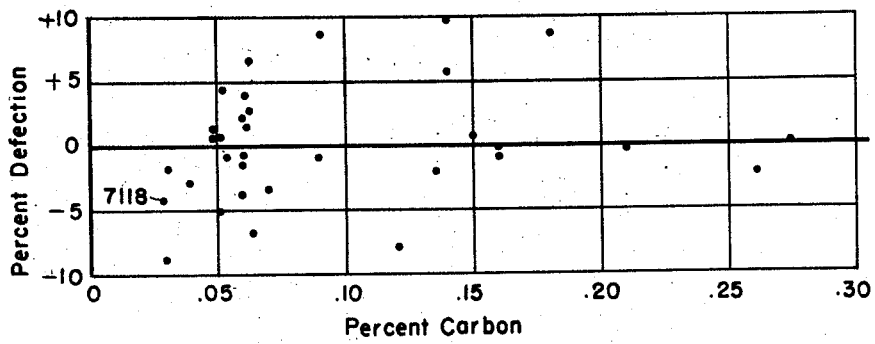

A study of the distribution of the points which determine the basic equation about this function is presented in Figs. 3a, 3b and 3c. This study indicates that the defection from the function $39,000+105,000\ C_E$ does not exceed plus or minus 10% and approaches these percentages only in a few cases. Each of these drawings, Figs. 3a, 3b, 3c, is a graph in which the percent defection from the basic equation is plotted vertically and the percent of each of the components silicon, manganese and carbon, respectively, is plotted horizontally.

The data for these graphs were derived from Table I. Assuming the percents of silicon, manganese and carbon for each heat, the ultimate strength U was calculated from the Equation 1 $U=39,000+105,000\ C+14,000\ Mn+16,000\ Si$. The difference between this calculated U and the actually measured U which appears in the sixth column in the row corresponding to the heat involved was then determined. From this difference, the percent of defection from the calculated U is determined. The points in Figs. 3a, 3b and 3c, respectively, are derived by referring the percent in each case to the core analysis which appears in the second, third and fourth columns. There is then a point corresponding to each of the heats on each of the Figs. 3a, 3b and 3c, the ordinate for each point being the percent defection determined as just described and the abscissa for each of the points being respectively the percents of silicon, manganese and carbon. For example, for heat 7118, the defection was calculated to be of the order of about −4.5%. The corresponding point for silicon appears in Fig. 3a along the vertical line extending from .4 at ordinate −4.5. The point for manganese appears in Fig. 3b along the line extending from .8 at ordinate −4.5 and the point for carbon appears in Fig. 3c for ordinate −4.5 between the vertical lines extending from zero and .05 respectively. These points are labeled in the drawing. The other points on the graphs, Figs. 3a, 3b, 3c, are similarly determined. The graphs show that Equations 1 and 2 are reliable, as they have proved in practice, because there is satisfactory agreement between Equations 1 and 2 and the actual data.

Figure 4:
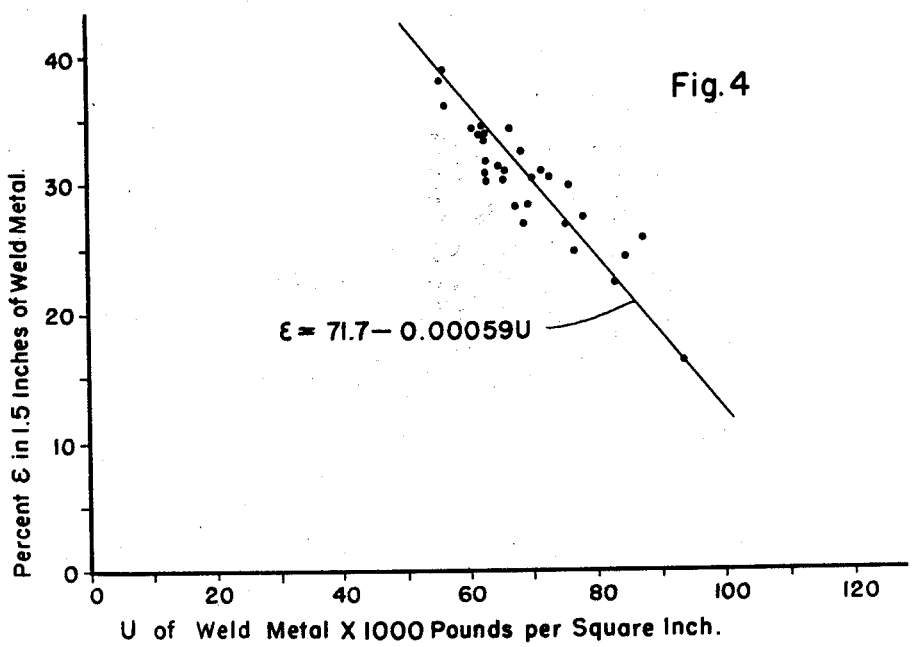
Fig. 4 is a graph showing the relationship between the elongation $\epsilon$ and the ultimate strength U for welds produced with an electrode in accordance with our invention.

The relationship between the elongation ϵ and the ultimate strength for welds produced with electrodes in accordance with our invention is presented in Fig. 4. This graph is plotted from the corresponding points in columns 6 and 7 of Table I, elongation ϵ in percent being plotted vertically and ultimate strength U in pounds per square inch being plotted horizontally. It is seen that the points lie along a straight line which satisfy the equation (3) $\qquad \epsilon = 71.7 - 0.00059\ U$ As appears from Fig. 4 and from this equation, the elongation varies inversely as the ultimate strength for welds produced with electrodes in accordance with our invention.

Figure 5:
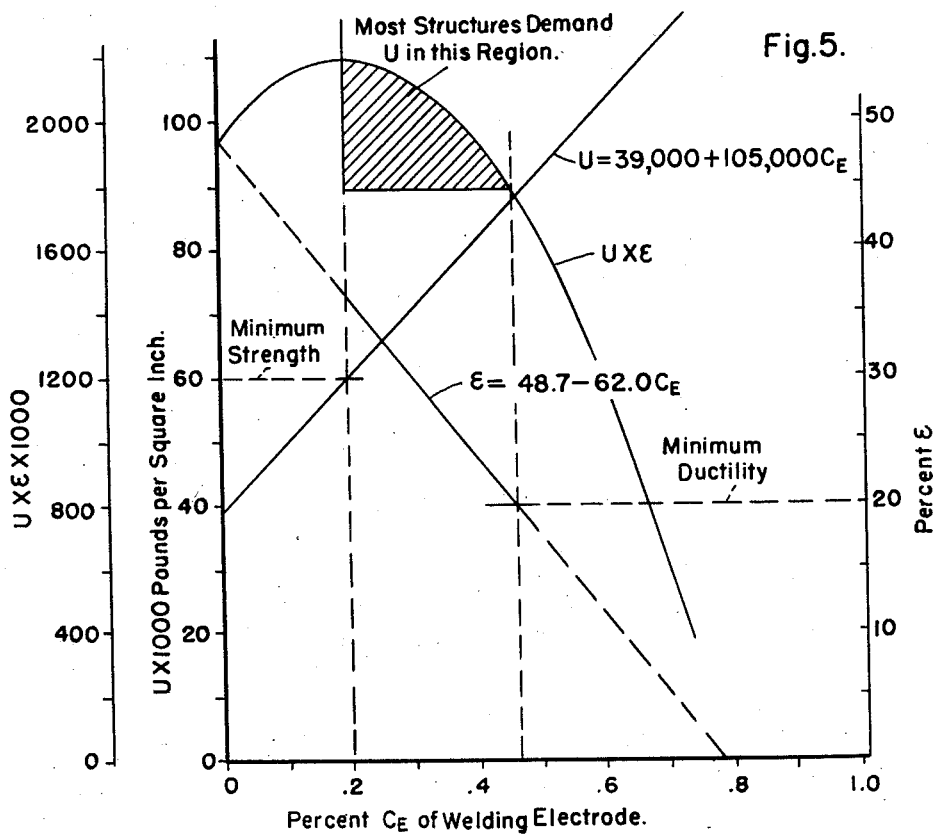
Fig. 5 is a graph showing the relationship between the ultimate strength, U, the elongation $\epsilon$, the work function $U \times \epsilon$ and the carbon equivalent $C_E$ of welds produced with electrodes in accordance with our invention.

An important feature of our invention is the discovery that there is a region of carbon equivalent, $C_E$, for which both the elongation and the strength are adequate for industrial purposes. This is derived from Fig. 5 which is a composite graph including the U curve of Fig. 2, the ϵ curve of Fig. 5 and a curve presenting the product of U and ϵ which may be called a work function curve. In Fig. 5, U, ϵ, and the product of U and ϵ are plotted vertically and the carbon equivalent $C_E$ is plotted horizontally. The abscissa on the ϵ curve for $\epsilon = 20\%$ gives the upper limit $C_E$ for which the welds have the desired ductility and the abscissa on the U curve for $U=60,000$ gives the lower limit of $C_E$ for which the welds have the desired strength. It is seen that the range of electrode composition which is useful for most industrial purposes lies between $C_E=.2$ and $C_E=.46\%$. Within this range the work function is a maximum and the strength is adequate for industrial purposes. The region of the work function curve which corresponds to the most satisfactory electrode is shown shaded.

Figure 8:
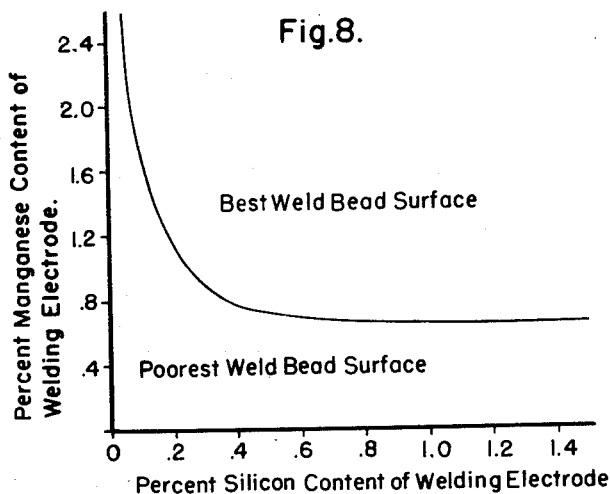
Fig. 8 is a graph showing the relationship between the manganese and the silicon content of a welding electrode in accordance with our invention for which the weld bead surface is satisfactory.

Since the electrode in accordance with our invention includes oxygen-containing arc-stabilizing materials, consideration must be given to the extent of the oxidation of the weld bead surface as an indication of the quality of the weld. We have, then, studied the weld bead surface of the welds covered by Table I and have classified them in accordance with their surfaces. We found that certain of the welds had smooth surfaces while others had randomly spaced recesses or pock marks which indicate oxidation. Our classification resulted in the discovery that a specific relationship exists between the manganese and silicon contents and the weld surface appearance. This is shown in Fig. 8. In this graph the percent of manganese content in the core of our welding electrode is plotted vertically and the percent of silicon content in the core is plotted horizontally. The curve shown in Fig. 8 is a boundary line for manganese and silicon contents on or above which the bead surface is smooth and below which the surface is marked. The curve shows that to an extent manganese and silicon are equivalents, a high manganese content and a low silicon content yielding a satisfactory bead surface as does also a low manganese content and a high silicon content. It appears, however, that the manganese content must be at least of the order of .58% while the silicon content may be as low as .09%.

Figure 6:
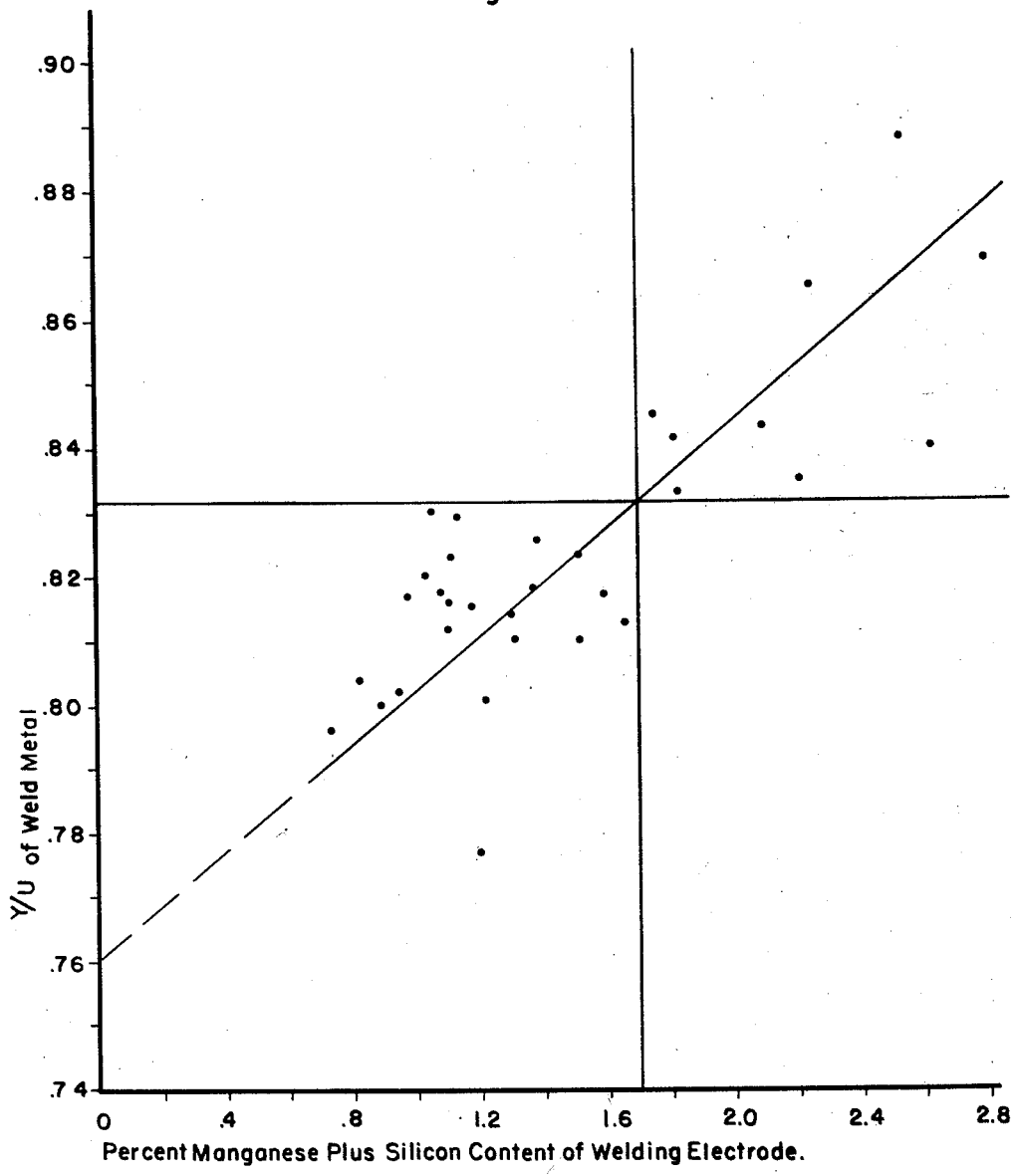
Fig. 6 is a graph showing the relationship between the ratio of the yield strength to the ultimate strength Y/U of the weld and the sum of the percentages of manganese and silicon in the electrode in accordance with our invention.
Figure 7:
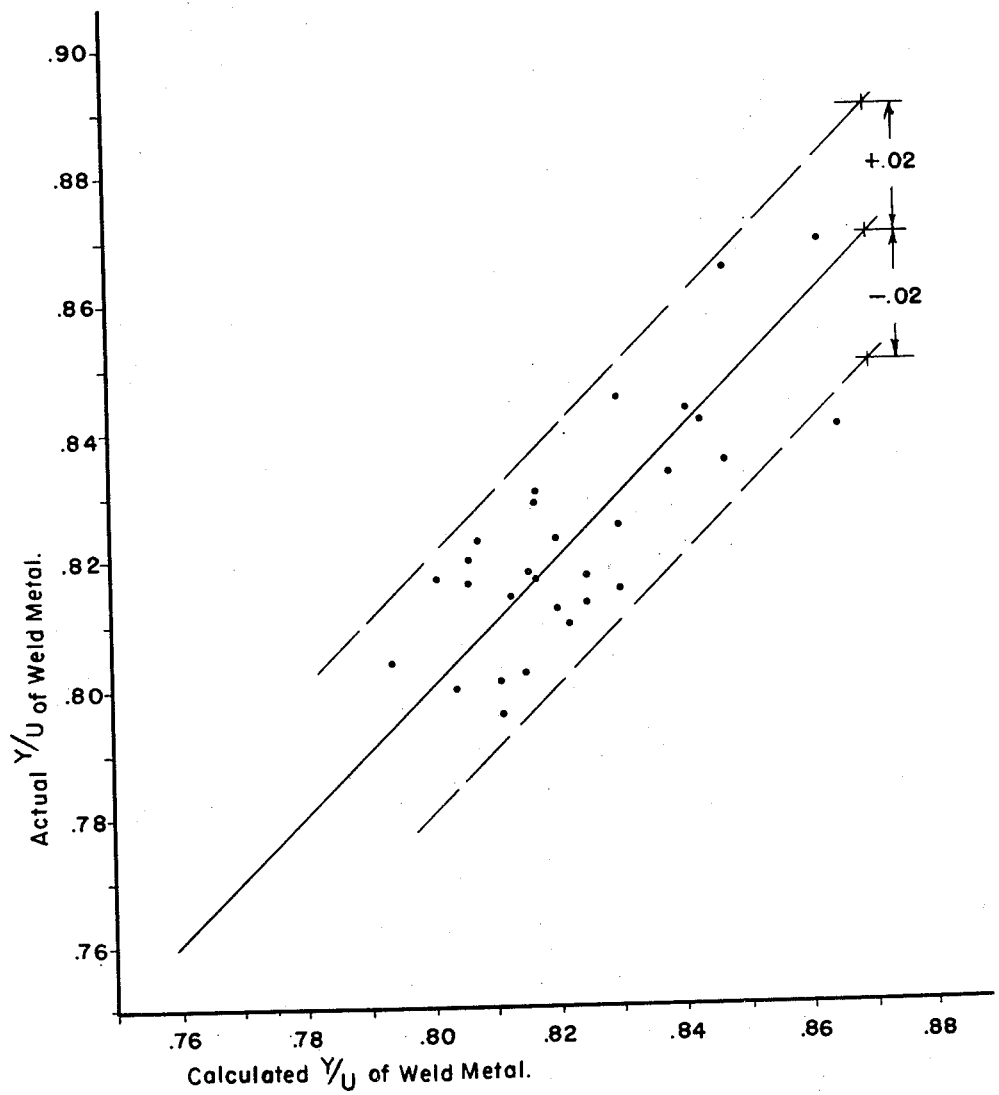
Fig. 7 is a graph showing the deviations of the ratio of the yield strength to the ultimate strength Y/U as actually measured and as calculated.

Another property of the weld metal which we studied is the yield strength Y. The ratio of the yield strength Y to the ultimate strength U is of interest, and Fig. 6 is a graph showing the relationship between the ratio Y/U and the percent of manganese plus the percent of silicon. It is seen that the ratio lies between 76% and 89% and has a linear trend which increases as the percent of manganese plus the percent of silicon in the core wire of the welding electrode increases. The high ratio is desirable; because of the high ratio, the ultimate strength demanded by a specific yield strength required in practice is relatively low and the ductility may then be comparatively high (see Fig. 5). Fig. 7 is a graph showing the deviations of the actually measured magnitude of Y/U from magnitudes calculated from the Equation 3: Y/U=0.76+.14 C+.035 Mn+.035 Si. The values of Y/U calculated from the Equation 3 are shown in Fig. 7 plotted horizontally and the actually measured values of Y/U as determined from Table I are plotted horizontally. It is seen, with only a few exceptions, the deviations do not exceed plus or minus .02.

Figure 9:
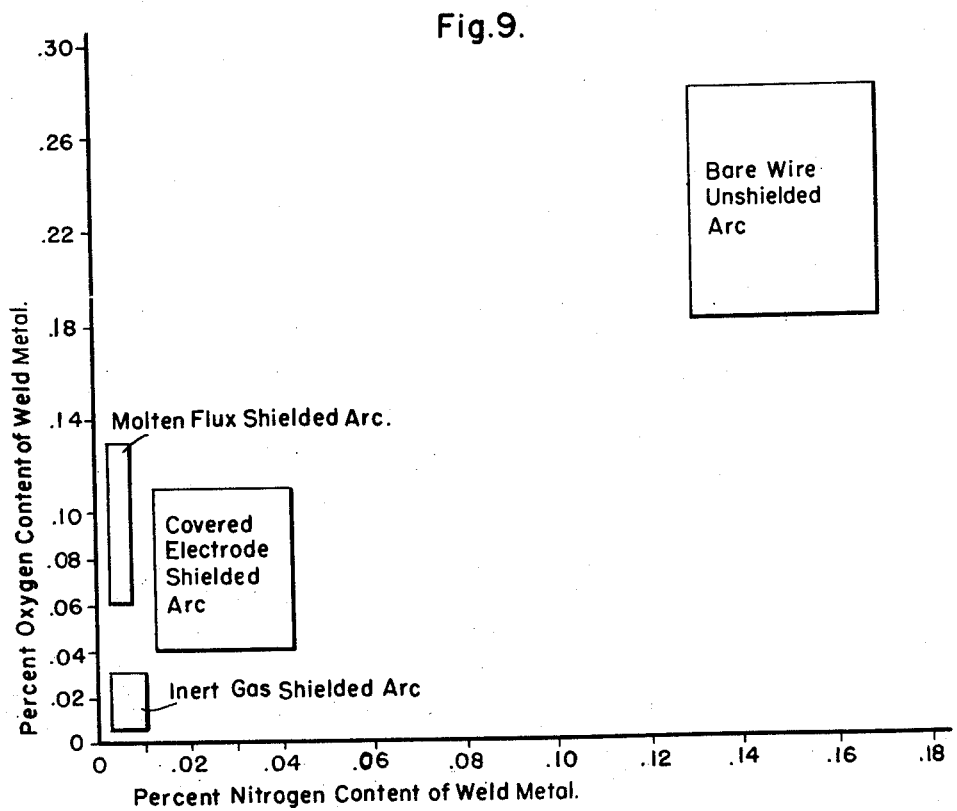
Fig. 9 is a graph comparing weld metals in accordance with our invention with prior art weld metals as regards oxygen and nitrogen content.

Oxygen or nitrogen content to an extent determine the strength and ductility of weld metal. As a general rule the greater the oxygen or nitrogen content, the greater the strength but the lower the ductility. In Table II, the oxygen and nitrogen content of weld metal produced with welding electrodes covered by Table I is given. This table shows the oxygen content for welding electrodes in accordance with our invention is low. For comparison purposes, Fig. 9 is presented. In this graph, the percent of oxygen content of weld metal is plotted vertically and the percent of nitrogen content of weld metal is plotted horizontally. The blocks show the areas of oxygen and nitrogen content of weld metals produced in accordance with our invention and of other prior art weld metals. The small block in the lower left-hand corner of the graph shows the area of oxygen and nitrogen content of weld metal in accordance with our invention. This block shows that the content of nitrogen does not exceed .011 and the content of oxygen does not exceed .031. A corresponding block for welds produced with an arc shielded with molten flux shows a nitrogen content as low as is produced in weld metal in accordance with our invention but a substantially higher oxygen content. In the case of the flux covered electrode, both the oxygen and the nitrogen contents are substantially higher, and in the case of the bare wire unshielded electrode, both the oxygen and the nitrogen are very high.

As appears from the above description, we have invented a welding electrode having a stabilizing oxygen containing layer with which weld metal having both a high ductility and a high ultimate strength can be produced. We have produced a large number of welds with this electrode and have found them to be highly satisfactory for industrial purposes demanding the highest quality, not only as regards ultimate strength and ductility, but also as regards ratio of yield strength to ultimate strength. As can be seen from Table II, the efficiency of alloy transfer is also high varying from 64% for carbon to 80% for manganese.

While we have shown and described a certain specific embodiment of our invention, many modifications thereof are possible. One modification of our invention involves the situation in which components of the work may, by alloying in the weld metal with the components transferred from the electrode, supplement the alloying components of the electrode to produce a weld in accordance with our invention. This may arise particularly in single pass welds in cases in which the work has a high percentage of one or more of carbon, manganese or silicon. In this case, high ultimate strength is obtained even with the equivalent carbon content $C_E$ of the electrode less than .2 because the carbon, manganese or silicon in the work supplies the additional $C_E$ component necessary in the weld. The relationship between the work and the electrode is in this case determined by considering the transfer efficiency for the various components in combination with the carbon, silicon or manganese content of the work.

For example, assume that the work has an equivalent carbon content of .30% and the electrode a carbon equivalent, $C_E$, of .10% (less than .2). Also assume that the work and electrode each become alloyed 50% in the weld. The equivalent carbon content in the weld is then (.10) (.72)+.30 divided by 2 or .19. (The .72 is derived by averaging the transfer efficiencies given at the bottom of Table II.) The equivalent percent of carbon in the electrode which would provide properties the same as .19 in the weld is obtained by dividing the .19 by the average alloy transfer efficiency, .72. That is, $$\frac{.19}{.72} \text{ which is } .26$$

This equivalent carbon content in the electrode is greater than the .2 lower limit.

Electrodes for welding with higher alloy content steel work as described above are within the scope of our invention.

Our invention is then not to be restricted, except insofar as is necessitated by the spirit of the prior art.

We claim as our invention:

1. In manufactures of the class described, a ferrous welding electrode particularly for making high ductility welds by consumable-electrode inert-gas-shielded welding, particularly at straight polarity, said electrode having a coating consisting essentially of at least one oxygen containing compound selected from the class consisting of metal oxides, metal carbonates and metal phosphates, the compound being such that during the arc welding process, it stabilizes the arc, and having a core of an alloy consisting essentially of an iron base and small quantities of carbon, manganese and silicon, the carbon, manganese and silicon being present in individual quantities equal to or exceeding .028 carbon, .58 manganese and .09 silicon and also satisfying the condition that in the equation $$C_E = 1.0\ C + 0.133\ Mn + 0.152\ Si$$

where C is the percent of carbon content, Mn the percent of manganese content, Si the percent of silicon content in said alloy, $C_E$ is less than .46.

2. In manufactures of the class described, a ferrous welding electrode particularly for making high ductility welds with smooth bead surfaces by consumable-electrode inert-gas-shielded welding, particlarly at straight polarity, said electrode having a coating consisting essentially of at least one oxygen containing compound selected from the class consisting of metal oxides, metal carbonates and metal phosphates, the compound being such that during the arc welding process, it stabilizes the arc, and having a core of an alloy consisting essentially of an iron base and small quantities carbon, managanese and silicon, the carbon, manganese and silicon being present in individual quantities equal to or exceeding .028 carbon, .58 manganese and .09 silicon and also satisfying the condition that in the equation $C_E = 1.0\ C + 0.133\ Mn + 0.152$, where C is the percent of carbon content, Mn the percent of manganese content, Si the percent of silicon content in said alloy, $C_E$ is less than .46, and the further condition that the said contents of manganese and silicon are so related that they lie on or above the curve shown in the accompanying Fig. 8.

3. In manufactures of the class described, a ferrous welding electrode particularly for making high ductility welds by consumable-electrode inert-gas-shielded welding, particularly at straight polarity, said electrode having a coating consisting essentially of at least one oxygen containing compound selected from the class consisting of metal oxides, metal carbonates and metal phosphates, the compound being such that during the arc welding process, it stabilizes the arc, and having a core of an alloy consisting essentially of an iron base and small quantities carbon, manganese and silicon, the carbon, manganese and silicon being present in individual quantities, equal to or exceeding .028 carbon, .58 manganese and .09 silicon and also satisfying the condition that in the equation $C_E = 1.0\ C + 0.133\ Mn + 0.152\ Si$, where C is the percent of carbon content, Mn the percent of manganese content, Si the percent of silicon content in said alloy, $C_E$ is between .2 and .46.

4. In manufactures of the class described, a ferrous welding electrode particularly for making high ductility welds by consumable-electrode inert-gas-shielded welding, particularly at straight polarity, said electrode having a coating consisting essentially of the oxides of manganese dioxide, titanium dioxide and calcium oxide in the following proportions by weight: manganese dioxide—10 to 30%; titanium dioxide—55 to 80%; calcium oxide—10 to 35%, and having a core of an alloy consisting essentially of an iron base and small quantities carbon, manganese and silicon, the carbon, manganese and silicon being present in individual quantities equal to or exceeding .028 carbon, .58 manganese and .09 silicon and also satisfying the condition that in the equation $C_E=1.0$ C+0.133 Mn+0.152 Si, where C is the percent of carbon content, Mn the percent of manganese content, Si the percent of silicon content in said alloy, $C_E$ is less than .46.

5. In manufactures of the class described, a ferrous welding electrode particularly for making high ductility welds with smooth bead surfaces by consumable-electrode inert-gas-shielded welding, particularly at straight polarity, said electrode having a coating consisting essentially of the oxides of manganese dioxide, titanium dioxide, and calcium oxide in the following proportions by weight: manganese dioxide—10 to 30%; titanium dioxide—55 to 80%; calcium oxide—10 to 35%, and having a core of an alloy consisting essentially of an iron base and small quantities carbon, manganese and silicon, the carbon, manganese and silicon being present in individual quantities equal to or exceeding .028 carbon, .58 manganese and .09 silicon and also satisfying the condition that in the equation $C_E=1.0$ C+0.133 Mn+0.152, where C is the percent of carbon content, Mn the percent of manganese content, Si the percent of silicon content in said alloy, $C_E$ is less than .46, and the further condition that the said contents of manganese and silicon are so related that they lie on or above the curve shown in the accompanying Fig. 8.

6. In manufactures of the class described, a ferrous welding electrode particularly for making high ductility welds with work having a high alloy content of one or more of carbon, manganese or silicon by consumable-electrode inert-gas-shielded welding, particularly at straight polarity, said electrode having a coating consisting essentially of at least one oxygen containing compound selected from the class consisting of metal oxides, metal carbonates and metal phosphates, the compound being such that during the arc welding process, it stabilizes the arc, and having a core of an alloy consisting essentially of an iron base and small quantities of carbon, manganese and silicon, the carbon, manganese and silicon being present in individual quantities equal to or exceeding .028 carbon, .58 manganese and .09 silicon and also satisfying the condition that in the equation $$C_E=1.0 \text{ C}+0.133 \text{ Mn}+0.152 \text{ Si}$$

where C is the percent of carbon content, Mn the percent of manganese content, Si the percent of silicon content in said alloy, $C_E$ is less than .2.

References Cited in the file of this patent
UNITED STATES PATENTS

| | | |
|---|---|---|
| 1,374,711 | Armor | Apr. 12, 1921 |
| 1,452,781 | Becket | Apr. 24, 1923 |
| 1,544,422 | Becket | June 30, 1925 |
| 2,022,307 | Austin | Nov. 26, 1935 |
| 2,239,465 | Nepoti | Apr. 22, 1941 |
| 2,623,147 | Willigen | Dec. 23, 1952 |

UNITED STATES PATENT OFFICE
CERTIFICATE OF CORRECTION

Patent No. 2,818,352                                               December 31, 1957

Howard C. Ludwig et al.

It is hereby certified that error appears in the printed specification of the above numbered patent requiring correction and that the said Letters Patent should read as corrected below.

Column 12, line 48, claim 2, and column 13, line 30, claim 5, insert -- $Si$ -- before the comma already appearing in each of the designated lines.

Signed and sealed this 18th day of November 1958.

(SEAL)
Attest:

KARL H. AXLINE                                            ROBERT C. WATSON
Attesting Officer                                          Commissioner of Patents